United States Patent [19]
Ling et al.

[11] 3,785,894
[45] Jan. 15, 1974

[54] TIRE BUILDING DRUM

[75] Inventors: Jack A. Ling, Clinton; Dennis W. Clem, Mogadore, both of Ohio

[73] Assignee: The Goodyear Tire & Rubber Company, Akron, Ohio

[22] Filed: Oct. 12, 1971

[21] Appl. No.: 188,269

[52] U.S. Cl. .............................. 156/415, 156/417
[51] Int. Cl. .......................................... B29h 17/16
[58] Field of Search .................... 156/123, 131, 132, 156/414, 415, 417, 420

[56] References Cited
UNITED STATES PATENTS

| R22,369 | 8/1943 | Bostwick | 156/415 X |
|---|---|---|---|
| 1,835,986 | 12/1931 | Heston | 156/420 |
| 1,877,746 | 9/1932 | Heston et al. | 156/420 |
| 1,946,449 | 2/1934 | Williams | 156/415 |
| 2,043,937 | 6/1936 | Templeton | 156/420 |
| 2,004,797 | 6/1935 | Pfeiffer | 156/415 |
| 2,201,469 | 5/1940 | Bostwick | 156/415 X |

FOREIGN PATENTS OR APPLICATIONS

| 1,160,059 | 7/1969 | Great Britain | 156/415 |

Primary Examiner—Clifton B. Cosby
Attorney—F. W. Brunner and R. S. Washburn

[57] ABSTRACT

A collapsible tire building drum having deeply inwardly turned flanges which move inwardly with the drum segments as the drum is collapsed. The collapsing mechanism includes two pairs of counter-rotatable hubs. Pairs of links respectively connected to each of the pairs of hubs move the respective segments toward and away from the drum axis in response to equal and opposite rotation of the hubs relatively of the drum spindle.

The foregoing abstract is not to be taken as limiting the invention of this application, and in order to understand the full nature and extent of the technical disclosure of this application, reference must be made to the accompanying drawings and the following detailed description.

33 Claims, 8 Drawing Figures

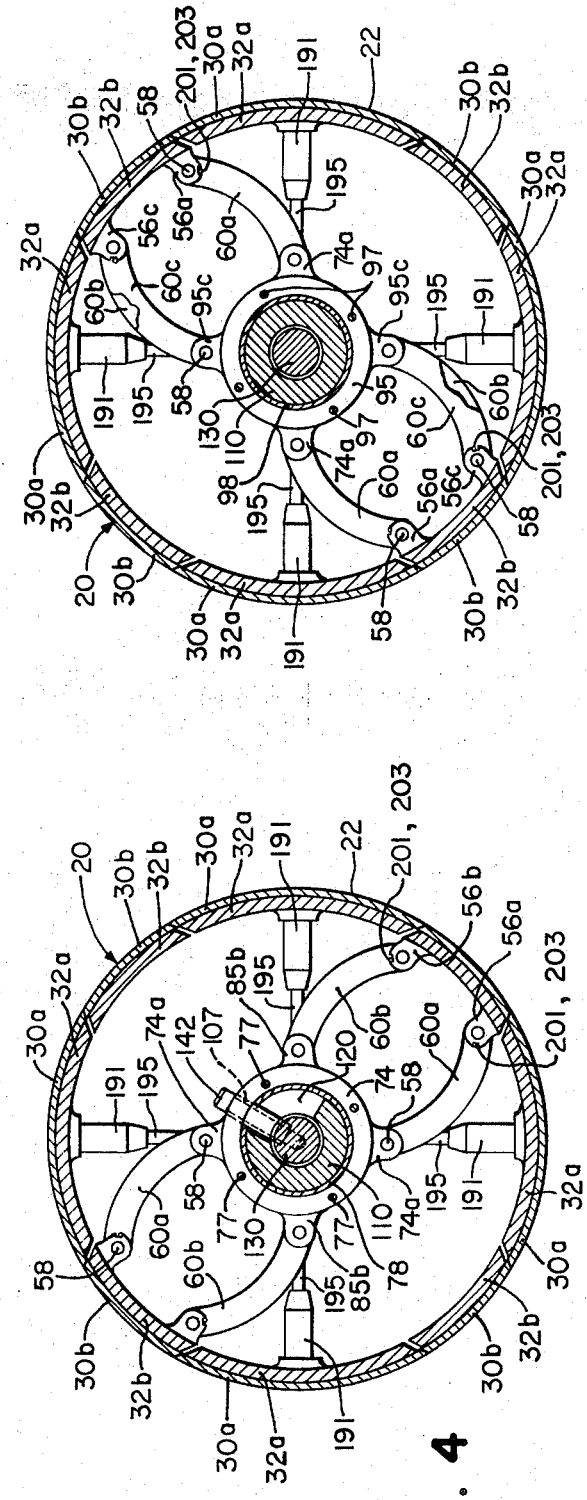
FIG. 5
FIG. 4
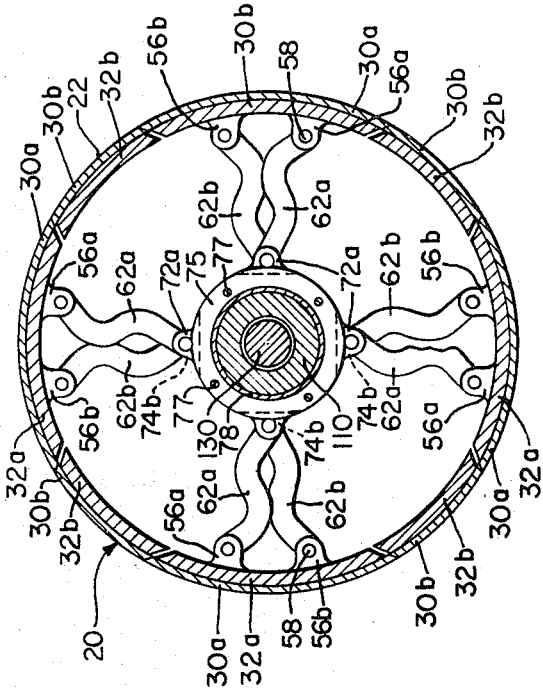
FIG. 6

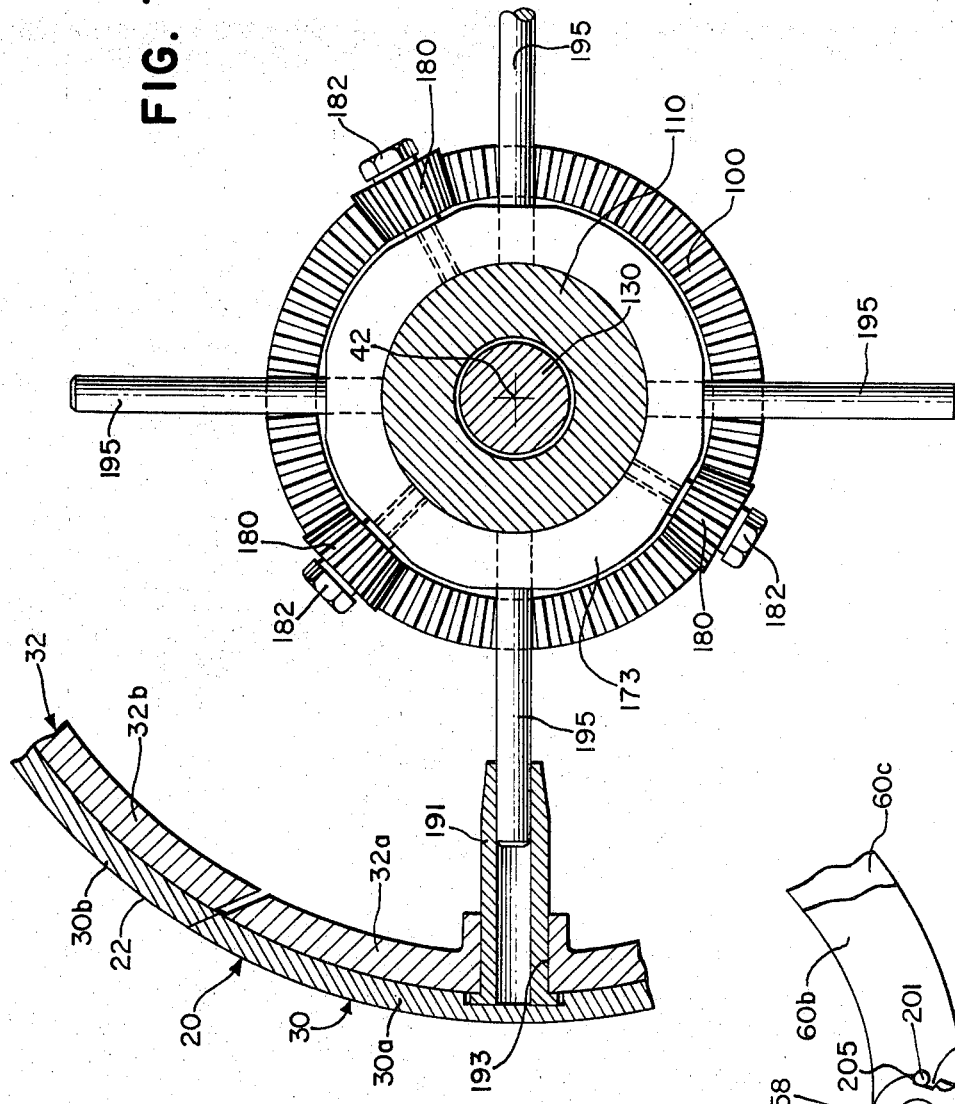

TIRE BUILDING DRUM

This invention relates to tire building apparatus and particularly to a rigid surface tire building drum which can be collapsed to permit removal therefrom of a tire after the same has been fabricated on such rigid surface. Such drums are commonly referred to as collapsing drums.

BACKGROUND OF THE INVENTION

It is well known that the circumference of an integral rigid body or drum cannot be reduced sufficiently to permit removal of a tire fabricated thereon. This fact has led to a multitude of proposed tire building drum designs and many patents which have in common the provision of a drum surface divided separably into a plurality of segments certain of which can be moved toward the drum axis earlier and farther than the remainder of the segments so as to reduce the circumference and permit removal of a tire. Numerous wholly satisfactory solutions have been put forward for the collapse of drums in which the segments thereof have relatively small radial dimensions.

For reasons well known to persons skilled in the art of tire design and tire manufacture, for the fabrication of certain tires, a tire building drum preferably includes radially inwardly turned flanges of significant radial dimension so that the ply or plies of which a tire if fabricated can be turned inwardly a substantial distance and be firmly supported while the bead portion is being formed. The bead portions and the adjacent parts of the sidewalls are supported by the flanges of the drum in an orientation generally approximating the orientation of the beads and lower sidewall in the finished tire. As a result, the annular space available between the bead inner circumference and the shaft on which such drum is carried is reduced. At the same time the radial dimensions of the segments to be moved into such space are markedly increased. For these reasons many tires continue to be built on drums not capable of being rapidly and efficiently collapsed.

Mechanisms which are quite satisfactory for collapsing rigid tire building drums in which the radial dimensions of the segments are relatively small are found not capable of sufficient diametrical change for the removal of tires which are fabricated with relatively large inwardly turned bead and sidewall portions. It also will be apparent that such difficulty is made greater by the trend toward tires of smaller bead diameters.

To cope with this particular problem heretofore, tire building drums have been designed to require removal from within the tire of certain parts or segments prior to the collapse of the remaining drum assembly. The removed parts have commonly included at least the annular flange rings which were necessarily broken down and removed manually at the cost of increased nonproductive time and effort.

SUMMARY OF THE INVENTION

This invention aims to overcome the difficulties referred to above and to provide an improved collapsing type tire building drum having novel structural features and advantages which will be made apparent hereinafter.

A principal object of the invention is the provision of a tire building drum which in its expanded working condition provides a circumferentially and axially continuous rigid tire building surface which surface includes annular radially inwardly extending flange portions of significant radial dimension and which drum is capable of being collapsed to a condition in which all of the drum parts including said flanges are disposed within a cylindrical space defined by the inside circumferences, as well as within the axial length between bead portions, of a tire fabricated thereon.

A further object of the invention is the provision of a collapsible tire drum having a high crown provided by radially inwardly turned flanges, portions of which are secured to and moved together with the respective segments comprising the drum. It is preferred that the drum be collapsible and re-expandable without removing any parts from the assembled drum.

An additional object is the provision of a collapsible tire drum in which each one of the plurality of segments constituting the building surface is supported relative to the axis at at least three locations spaced apart axially of the drum and at least one of which locations is spaced circumferentially apart from the other location or locations.

Yet another object of the invention is the provision of means for collapsing and expanding the drum which means comprises a plurality of pairs of hub means each mounted movably relative to the drum surface, and in particular, rotatably about the rotational axis of the drum and spaced axially therealong.

A still further object is the provision of a collapsible tire building drum in which the collapsing means includes means operable to rotate the respective hub means of each pair of hub means in equal and opposite rotational senses so that the torque required for collapsing or expanding the drum is applied through a plurality of paths thereby making generally equal the forces applied to the two axial halves of the drum and reducing the forces exerted on each of the hubs such that the structure therefor may occupy less space within the drum.

The foregoing objects, as well as other objects and advantages which will become apparent or be particularly pointed out in the description which follows, are accomplished according to a preferred form of the invention by a tire building drum comprising a plurality of parti-cylindrical segments each terminating axially in radially inwardly turned flange portions of substantial radial dimension, support means disposed coaxially of said segments, a plurality of pairs of hub means mounted on said support means and movable with respect thereto, and a plurality of pairs of links each link being pin-connected at its outer end to one of said segments and at its inner end to a respectively associated one of said hub means, and means operable to effect movement of the respective hubs of each said pair thereof.

THE DRAWINGS

In the description of an exemplary and presently preferred embodiment of the invention which is claimed herein, reference is made to the attached drawings in which:

Figure 1:
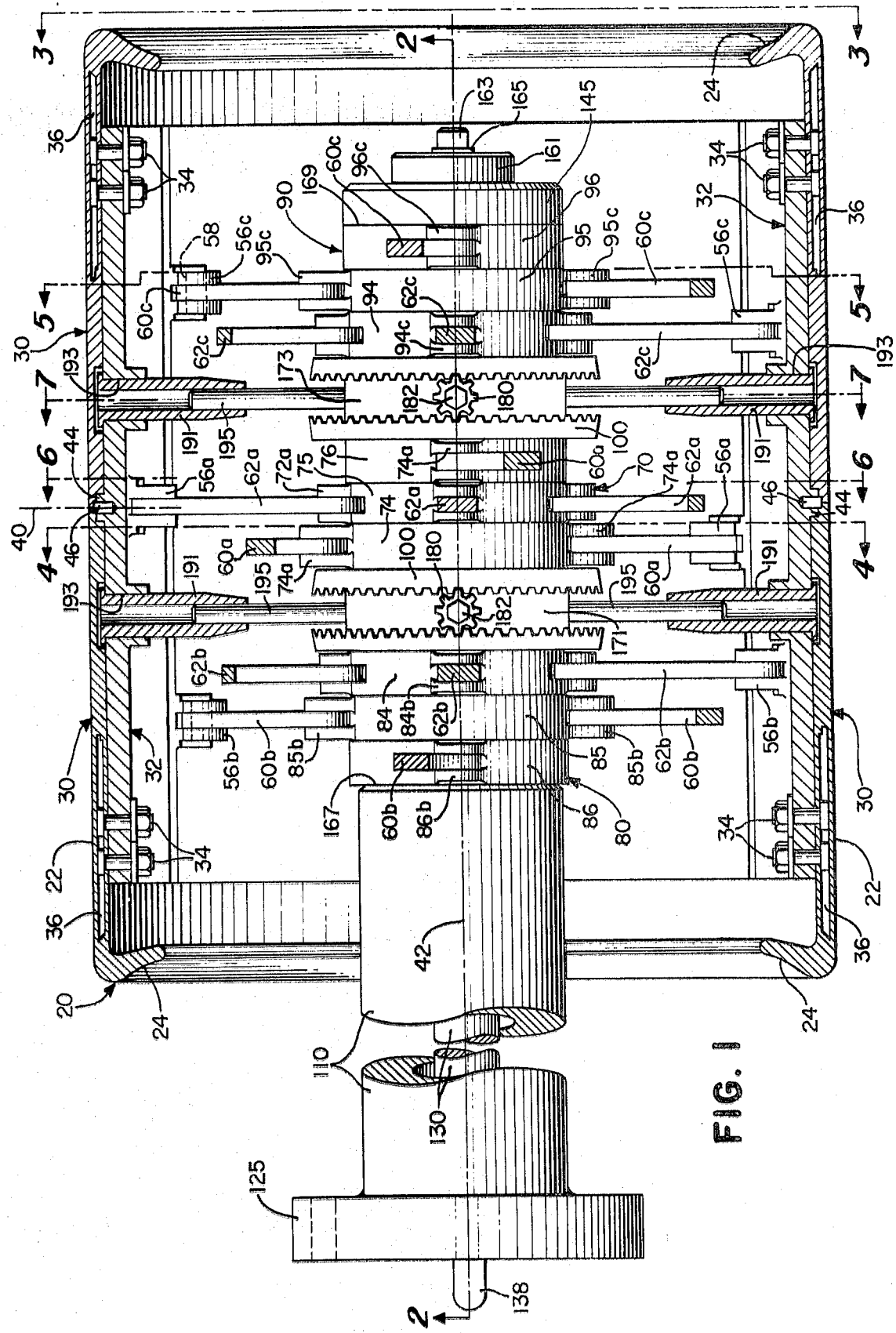
FIG. 1 is an elevation view, portions having been removed to show interior details, of a tire building drum in accordance with the invention.

FIGS. 4, 5, 6, and 7 are respective cross-sections of the drum of FIG. 1 taken respectively along the section lines 4—4, 5-5, 6—6, and 7—7; and FIG. 8 is a detail view, enlarged, of a feature of the drum of FIG. 1.

DETAILED DESCRIPTION OF A PREFERRED EMBODIMENT

Figure 3:
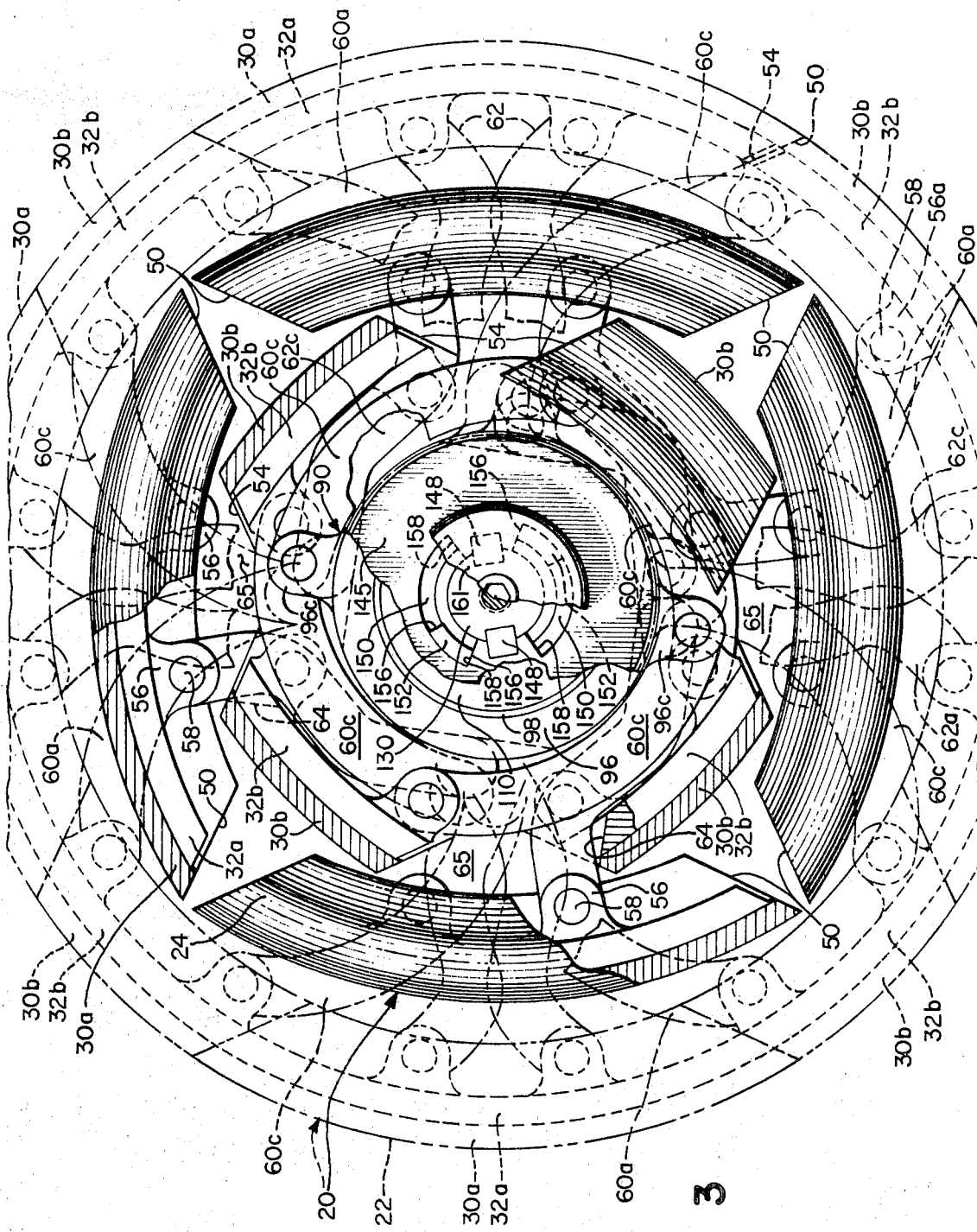
FIG. 3 is an end view of the drum shown in FIG. 1, taken as indicated by the line 3—3 of FIG. 1, with the drum in its collapsed state.

Referring to the drawings and particularly to FIGS. 1 and 3; a tire building drum 20 illustrative of the principles of the invention provides a rigid generally cylindrical tire building surface 22 terminating in radially inwardly turned flanges 24 of suitable configuration for the accommodation of inwardly turned fabric edges forming the bead portions of a tire in the manner well understood in the tire making arts.

The building surface 22 is provided by a plurality of pairs of cover segments 30, including 30a and 30b, of alternating greater and lesser arcuate dimension, as best seen in FIG. 3. The pairs of segments 30 are secured respectively to the body segments 32, including larger segments 32a and smaller segments 32b (presently to be described in greater detail) by conventional T-bolts 34 the heads of which cooperate with the T-slots 36 in the cover segments 30 to permit adjustment of the axially aligned pairs of the cover segments toward and away from a center plane 40 normal to the drum axis 42 where the individual segments of each pair abut each other at a circumferential rib 44, portions of which are carried on each of the respective body segments 32. With the segments 30 suitably spaced apart axially, in a known manner, axial length spacer pieces (not shown) can be inserted and located circumferentially by the dowels 46 in order to extend further the axial length of the drum surface 22 if desired.

The respective cover segments 30, in the expanded and working state of the drum, are in abutting relation to form a circumferentially, as well as axially, continuous rigid surface upon which a tire can be fabricated.

While the respective portions of the flanges 24 associated with each of the cover segments 30 can be secured to the segments in any convenient manner, in the present embodiment these flange portions are formed integrally with the individual segments 30. In the description which follows, the flanges 24 are described as being radially inwardly turned. It will be understood that the particular surface contour illustrated in the drawings is only one of numerous such contours which are chosen conventionally to suit the particular tire which may be built. The term, significant radial extent, as used herein with reference to the crown of the drum 20 and to the radial dimension of the flanges 24 of the drum, will be understood to mean a crown or radial extent of not less than about 1½ inches.

The plurality of cover segments designated generally by the numeral 30 includes the several segments 30a of larger arcuate extent, distinguished by the suffix a and the several segments 30b of lesser arcuate extent given the suffix b. The drum 20 has four pairs each of segments 30a and 30b. The larger segments 30a are respectively secured to a plurality of larger body segments 32a and the smaller segments 30b to a plurality of smaller body segments 32b. Like the cover segments, the body segments 32a and 32b are disposed alternately, larger and smaller, around the circumference of the drum. The arcuate dimensions of the larger and smaller body segments are appropriately proportional to the arcuate dimensions of the respective cover segments but the respectively adjacent axial edges of the body segments 32 do not, however, make contact in the expanded condition of the drum but rather are spaced arcuately apart a small distance.

The two axially extending edges 50 of each of the larger cover segments 30a lie in planes which are convergent toward the axis 42 of the drum 20. The respectively associated axially extending edges 54 of the smaller cover segments 30b lie in planes which are convergent away from the axis. In the expanded condition of the drum the abutting edges 50, 54 of the adjoining larger and smaller segments 30a and 30b respectively are conformed to provide circumferential continuity and support.

In accordance with the present invention, the structure and the operation particularly of the means by which the drum is collapsed and expanded, now to be described, offers particular advantages particularly in the capability of a larger reduction in the circumference of the drum, thus affording the ability to separate from a drum of higher crown a tire of relatively small diameter.

While it will become apparent as the description proceeds that the principles of the present invention can be applied to collapsing tire drums in which the respective segments are moved inwardly toward the axis during collapse of the drum by axial as well as radial displacement, the collapse of the drum 20 is accomplished by moving the respective segments inwardly without significant axial displacement and in a uniform axially symmetric array.

Each of the segments 32a, 32b has three pin lugs 56, including 56a, 56b, 56c affixed on the radially inner wall thereof. The lugs 56a are placed one in the axially intermediate portion of each segment. The lugs 56b and 56c are spaced axially outwardly toward the respective ends of each segment and cooperate with the lug 56a to form two pairs of lugs on each segment. The lugs 56b and 56c are, in each respective segment, located in a common axial plane spaced angularly from the axial plane in which the lug 56a is placed. The respective pin lugs of diametrically opposite segments are located in common planes normal to the drum axis which planes of location are offset axially with respect to the planes of location of the respective lugs of the other pairs of segments 32a and 32b.

Link means which link each of the segments of the drum 20 with the respectively associated hub means to be described presently comprise a plurality of pairs of links the individual links of which are connected respectively at their radially outer ends to the individual pin lugs of the previously described pairs thereof.

Each of the smaller segments 32b, which move inwardly in advance of the larger segments 32a, has connected thereto two pairs of links which are identical in form but are assembled in the drum faced respectively oppositely. One link 60a of each pair is connected to the pin lug 56a and one link 60b, 60c of each of the other pairs is connected to a respectively associated axially outer pin lugs 56b and 56c. In order for each of the links to lie closely about the respectively associated hub means while the drum is in its fully collapsed position, each of the links is appropriately curved, as may be seen in FIGS. 3, 4, or 5.

The link means includes a plurality of pairs of links each one of which is connected respectively to one of the pin lugs 56 of the larger segments 32a. The link 62a is connected to the intermediate pin lug 56a and the other link 62b, 62c of each pair is connected respectively to the axially outwardly located pin lugs 56b, 56c. The links of the pairs 62a–62b, 62a–62c connected to the larger segments 32a are identical but are also assembled to face oppositely. As best seen in FIG. 6, each of the links is formed as an S-shape one lobe of which accommodates the profile of the respectively associated hub means while the drum is in its collapsed state while the other lobe of the S-shape enables the outward portions of the links to be accommodated in the arc space 65 between the smaller segments 32b which in the collapsed state of the drum lie radially inwardly of the larger segments 32a. While the body segments 32b have notches 64 which accommodate the respective links while the drum is collapsed, the arrangement is such that the cover segments 30 require no surface interruption and thus provide a fully continuous surface on which a tire can be compacted smoothly and regularly by conventional stitchers.

The effective length of the links, e.g. 60a, connected to the smaller segments 32b is greater than the effective length of the links, e.g. 62a, connected to the larger segments 32a. The effective length is defined as the distance between the centers of the two pivot pins 58 in the respective link.

Figure 2:
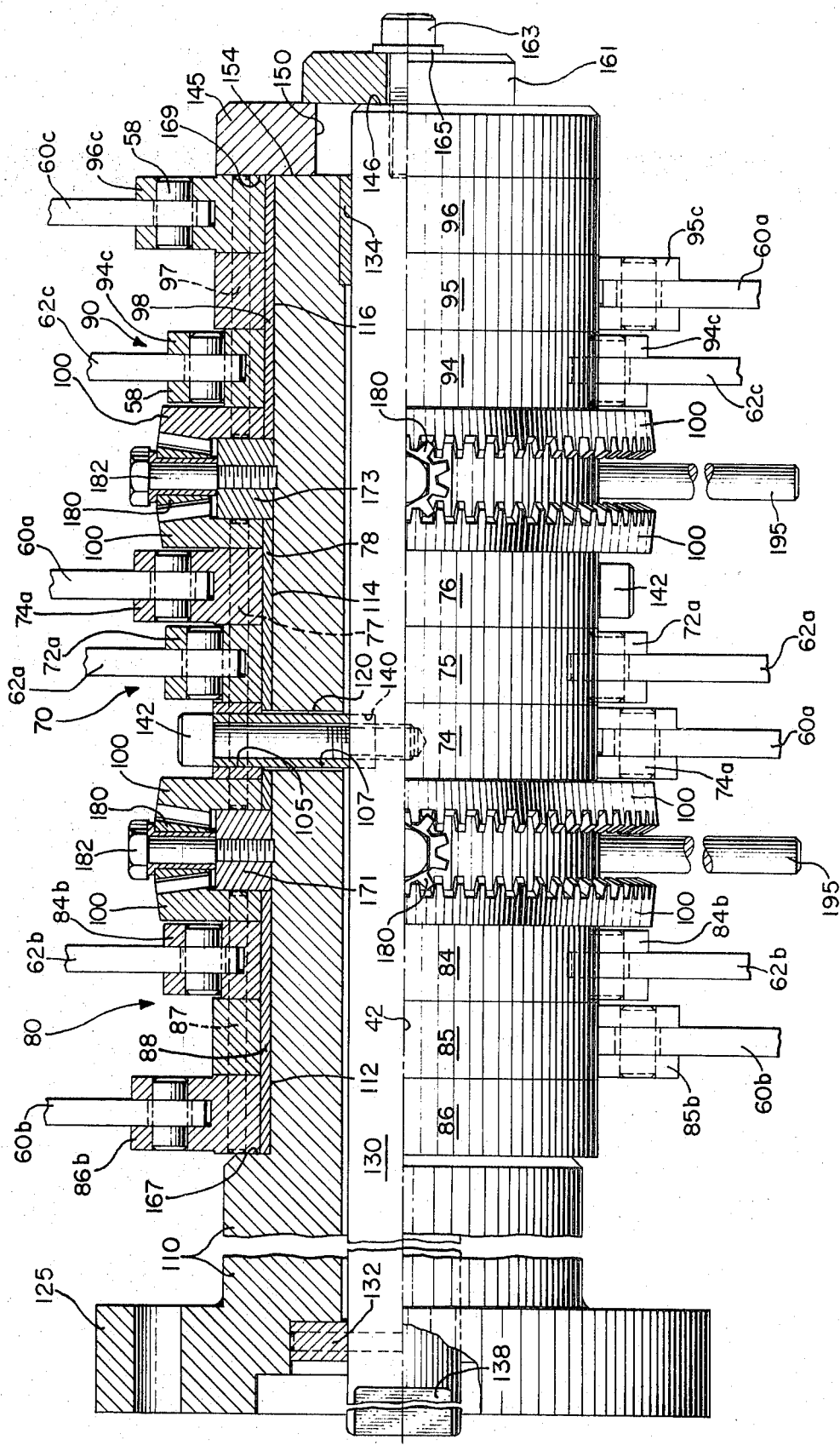
FIG. 2 is an elevation view, enlarged and partly in cross-section, and with certain elements rotated into the section plane for clarity, to illustrate the expanding-collapsing mechanism of the drum of FIG. 1, taken on the lines 2—2 thereof.

Referring to FIGS. 1 and 2; according to the invention, the drum 20 is provided with hub means comprising a plurality of pairs of hubs to which the link means are connected to effect collapse and expansion of the drum. Of each pair of hub means one hub means comprises the intermediate hub 70 mounted for coaxial rotation and having a plurality of pin lugs 72a, 74a to which the radially inner ends of the links 60a and 62a respectively are pivotably connected by pins 58. For convenience in manufacture the hub 70 has three hub discs 74, 75, 76 assembled coaxially and corotatably by the pins 77 on the sleeve bearing 78. The disc 75 has four pin lugs 72a equally spaced about the axis 42. The disc 74 has two pin lugs 74a spaced equally about the axis and the disc 76 has two pin lugs 74a spaced equally about the axis and at 90 degrees with respect to the disc 74. The pin centers of the lugs of the discs 74 and 76 are located in axial planes perpendicular to each other, which planes also locate the four lugs of the disc 75. The other hub means of each pair thereof are provided by the hubs 80 and 90 to which the other link 60b, 62b, and 60c, 62c of each said pair of links is respectively pivotally connected, by the pivot pins 58. Each of the hubs 89, 90 comprises a disc 84, 94 respectively having four pin lugs 84b, 94c spaced equally about the drum axis to which lugs the radially inward ends of the links 62b and 62c linking the larger segments are respectively connected, a second hub disc 85, 95 having two pin lugs 85b, 95c spaced equally about the axis, and a third disc 86, 96 also having two pin lugs 86b, 96c spaced equally about the axis and at 90° with respect to the pin lugs of the associated second disc 85 and 95, the relative orientation of the lugs being identical to that described in connection with the hub 70. The three discs of each hub are mounted coaxially and corotatably on a sleeve bearing 88, 98 and secured together by a plurality of axially extending pins 87, 97. The pin lugs 85b, 95c, 86b, 96c of the second and third discs are connected respectively pivotally to the inner ends of the respective links 60b, 60c by which the small segments 32b are moved.

Each of the hubs 70, 80, 90 carries a bevel ring gear 100 coaxially and corotatably mounted thereon with the gear of each hub of each pair facing outwardly of the hub assembly and toward the other hub of the pair.

In the disc 74 of the hub 70 which is common to both pairs of hubs, a radial bore 105 accommodates a sleeve 107 snugly fitted therein and which extends radially inwardly of the disc.

Spindle means in the drum 20 is provided by a hollow spindle 110 extending coaxially of the segments and providing a plurality of coaxially extending cylindrical bearing surfaces 112, 114, 116 on which the respective hubs 70, 80, 90 are mounted for rotation relatively of the spindle. An opening or window 120 through the wall of and elongated in the circumferential direction about the spindle 110 in one quadrant allows the sleeve 107, which extends radially through the window, to move arcuately relative to the spindle. A mounting flange 125 attached to or integral with the spindle 110 is adapted for mounting upon a conventional tire machine by which the drum is carried and caused to rotate at the wall of the operator during the tire-building operation.

Operating means in the form of an operating shaft 130 mounted coaxially within the spindle, and supported therein by suitable bearings 132, 134 on which the shaft can be rotated either with or relatively with respect to the spindle, extends from end to end of the spindle. The end of the shaft adjacent the mounting flange has a coupling 138 by which the shaft is connected to turning means for effecting rotation thereof relative to the spindle 110. The turning means can be of any suitable form and does not fall within the scope of the present invention.

In order to provide positively for corotation of the shaft 130 with the hub 70, the sleeve 107 is snugly received in a recess 140 formed in the shaft to which the sleeve is firmly secured by means of the bolt 142.

Means for positively limiting the rotation of the shaft 130 with respect to the spindle 110 includes a coupling 145 secured corotatably to the end 146 of the shaft by keys 148. The coupling has a pair of opposed arcuate slots 150, best seen in FIG. 3, extending axially therethrough and in which are disposed a pair of particylindrical tongues 152 fixed upon and extended axially outwardly from the end 154 of the spindle. The arcuate dimensions of the respective tongues 152 and of the slots 150 associated therewith in the coupling 145 are coordinated so as to limit the angular movement, and so prevent over travel, of the shaft 130 with respect to the spindle 110, the axial edge or edges 156 of the tongues abutting the radially extending ends 158 of the slot or slots at the limits of such angular movement. The coupling 145 is retained on the shaft 130 by a cap 161 secured coaxially thereon by a bolt 163 and washer 165.

The respective hubs are secured against axial displacement along the spindle by and between a radially extending annular surface 167 formed in the body of the spindle and the radially extending face 169 of the coupling. Between each respective pair of hubs is a ring 171, 173 secured coaxially and corotatably on the spindle 110. The radial faces of the respective rings are in abutting relation with the corresponding surfaces of the respective hub means.

Referring also to FIG. 7; a plurality of bevel pinions 180, 6 in the drum 20, are mounted for rotation on pinion studs 182 fixed on each of the respective rings 171, 173, with their rotational axes extending radially of the drum axis 42. Each of the pinions is in meshing engagement with the bevel gears 100 carried by the two respectively adjacent hubs. As will be evident from FIGS. 1 and 2, each hub of the respective pairs thereof are so drivingly connected for rotation in equal and opposite senses by the bevel gears and pinions.

It is desired that the respective segments move radially of the axis without excess angular movemnt thereabout so that interference between the respective segments and between the segments and the respective link means be minimized. To this end the drum includes means for guiding the segments by limiting relative angular displacement between each segment and the respectively associated links, so as to guide the body segments in at least an approximate radial path during collapse of the drum. Means for guiding each of the larger segments 32a is provided by a sleeve 191 which is secured in a hole 193 bored radially in the respective segments 32a and which sleeves cooperate respectively with the fixed rods 195 secured in and extending radially outwardly of the previously described rings 171, 173. In the present embodiment the larger segments are thus guided in direct radial paths perpendicular to the axis.

Referring to FIG. 8; means for guiding the smaller segments by limiting angular movement thereof is provided by a stop pin 201 which is rigidly secured in the outward end portion of each of the links 60a, 60b, 60c. Each of the respectively associated pin lugs 56a, 56b, 56c of the small segments 32b has an arcuate slot 203 formed therein radially outwardly of the pivot pin 58 which slots terminate in radially extending ends 205 spaced angularly about 30 degrees apart. During inward or outward movement of the smaller segments 32b, pin 201 by movement in the slot 203 permits some relative angular movement between the segment 32b and the respectively associated links 60a, b c, which angular movement is limited by the engagement of the stop pins 201 with one or the other end surface 205 of the slot.

Operation of the tire building drum 20 in accordance with the invention is, while the drum is in its expanded state, completely conventional and well understood by persons skilled in the art. In order to effect the collapse of the drum to permit removal of a tire built thereon, the shaft 130 is caused to rotate relative to the spindle 110. The middle hub 70 which is one hub of each pair 70-80, 70-90 in the present embodiment, and which is corotatably secured to the shaft 130 is thus rotated through an angle equal to the angle of rotation of the shaft, about 80°. Rotation of the shaft is limited also by the movement of the respective tongues 152 within the arcuate slots 150 of the stop coupling 145. Rotational movement of the hub 70 and of the ring gears 100 affixed thereon causes, through the respective bevel pinions 180, an equal and opposite rotational movement of each of the hubs 80 and 90. The radially inner ends of the two links of each pair, e.g. 60a-60b, 62a-62c, being pin connected to respectively oppositely rotated hubs, e.g. 70-80 and 70-90, are moved arcuately apart so as to effect movement of each of the segments inwardly toward the axis. To effect collapse, the hub 70 is rotated to move the near surface upwardly, as in FIG. 1, and clockwise as seen in FIG. 3, while the hubs 80 and 90 are rotated equally and oppositely by the driving connection provided by the gears 100 and pinions 180. The smaller segments 32b are moved inwardly more rapidly than the larger segments 32a by virtue of the fact that pivot pins 58 in the inner ends of the respective links 60a, 60b, 60c connected to the small segments are disposed at approximately 45° in advance, in the direction of movement of the respective hubs to which they are attached, with respect to the pivot pins in the inner ends of the links 62a, 62b, 62c connected to the larger segments. The smaller segments are thus withdrawn inwardly within the confines of a circumscribing cylinder and completely within the larger segments. The larger segments are connected to the respective hubs by pins 58 which are disposed, in the expanded position of the drum, slightly behind, in the direction of rotation of the respective hubs, the axial planes which bisect the respective larger segments. This disposition of the pins causes the respective counter-rotations of the hubs to cause the larger segments to move, initially, radially outwardly slightly and then radially inwardly. The larger segments 32a, continuing to move radially inwardly, are collapsed within the confines of a circumscribing cylinder which is less in circumference than the inmost circumference of the bead portions of the tire built on the drum, rendering removal of the tire easy.

Expansion of the drum to its fully expanded tire building state is accomplished simply by rotation of the shaft 130 in the opposite sense relative to the spindle 110 whereupon the rotation sense of the respective hubs is reversed and the segments brought into full circle condition by the movement of the respective links. The larger segments, because of the previously described relation of the inner ends of the links, are moved outwardly slightly beyond their finally expanded circumference and then finally slightly retracted so that the axially extending edges of the respective cover segments 30a, 30b are brought into firm contact, although without relative sliding thereof, thereby increasing the rigidity of the drum for building a tire thereon.

The drum according to the invention has a number of advantages of particular utility in the manufacture of small diameter tires with high crown. The drum is collapsed in axi-symmetrical form which eliminates any necessity to stop the drum rotation at any particular positon for removal of a tire built thereon, as well as allowing bead cores to be moved axially over the drum while it is in its collapsed state. Nor is it necessary in any way to ovalize either the tire being removed or the beads being prepositioned. The mechanism described is completely self-locking and wholly free from risk of collapse due to tangential forces as sometimes occur in starting and stopping the rotation of a drum. On the other hand, operation of collapsing the drum is simple and positive, it being necessary only to cause rotation of the shaft relative to the spindle by any convenient means. The axial offset of the respective pairs of links from one another affords the ability to retract the respective segments radially inwardly to positions close to the spindle thereby affording a maximim change of radius during the collapse of the drum.

A particular advantage by which maximum radius change is obtained is associated with the two pairs of counter-rotating hubs, namely, hubs 70 and 80; and 70 and 90. The torque required to rotate the second or intermediate hub 79 is divided by way of the two sets of bevel pinions and by them communicated to the respective other hubs. Possible torsional deflection of the operating shaft thus cannot result in inaccurate positions of the segments. This relatively symmetrical distribution of force avoids the difficulty experienced in some collapsing drums wherein the collapsing segments fail to remain parallel to the axis of the drum during the collapsing or expanding movement or when fully expanded.

While certain representative embodiments and details have been shown for the purpose of illustrating the invention, it will be apparent to those skilled in the art that various changes and modifications may be made therein without departing from the spirit or scope of the invention.

What is claimed is:

1. A tire building drum comprising a plurality of pairs of respectively counter-rotatable hubs mounted coaxially about a longitudinal drum axis, drive means drivingly connected to effect opposing rotation of the respective hubs of each said pair, a plurality of segments defining a tire building surface, link means connecting each of said segments with at least two pairs of said hubs and operative to move each said segment toward said axis in response to rotation of said hubs to collapse the drum.

2. A drum as claimed in claim 1, said drive means including a bevel gear corotatably mounted on each of said hubs, and a plurality of bevel pinions each mounted for rotation about an axis normal to said drum axis and drivably meshed with an opposed pair of said bevel gears.

3. A tire building drum comprising a plurality of segments collectively cooperable to form a rigid tire building surface, spindle means disposed coaxially of said segments, a plurality of pairs of hub means mounted on said spindle means and movable relatively thereof, link means including a plurality of pairs of links pivotally connected to each said segment and respectively to each associated pair of said hub means, and operating means operable to effect relatively opposite movements of said hub means and of the respective links of said pairs of links to effect inward movement of each said segment to collapse said drum.

4. A drum as claimed in claim 3, said plurality of segments including a plurality of large segments of greater arcuate extent and a plurality of small segments of lesser arcuate extent, the axially extending edges of the large segments being convergent toward the axis and overlying the axially extending and divergent edges of the respective small segments while the respective segments are in abutting circumferentially continuous relation.

5. A drum as claimed in claim 4, said tire building surface being circumferentially and axially continuous and including radially inwardly extending annular flanges comprising arcuate flange portions permanently affixed on each of said segments.

6. A drum as claimed in claim 4, each said segment comprising a base segment and a cooperating pair of cover segments, each said cover segment having an arcuate portion of one of said flanges fixed at the axially outward end thereof.

7. A drum as claimed in claim 6, each said cover segment having means for adjustably fixing its axial position relative to the respectively associated base segment.

8. A drum as claimed in claim 3, each said segment having a plurality of pairs of pivot connections one of each said pair of connections being connected respectively to one of each said pair of links, the other of each said pair of connections being pivotally connected to the other of each said pair of links, one connection of each said pair thereof being located axially intermediately of and spaced angularly apart from the respective other connections of each said pair thereof.

9. A drum as claimed in claim 8, said plurality of segments including a plurality of large segments of greater arcuate extent and a plurality of small segments of lesser arcuate extent, each said segment comprising a base segment and a cooperating pair of cover segments each having an arcuate portion of one of said flanges fixed at the axially outward end thereof and having means for adjustably fixing its axial position relative to the respectively associated base segment.

10. A drum as claimed in claim 3, each said pair of links including a first rigid link pivotably connected to each said segment intermediate the axial ends thereof at a first angular location and pivotally connected to one hub means of each said pair of hub means, and a second rigid link pivotally connected to the other hub means of each said pair of hub means and to each said segment axially outwardly of the first said link and at a second angular location spaced from the first said location.

11. A drum as claimed in claim 10, said plurality of segments including a plurality of large segments of greater arcuate extent and a plurality of small segments of lesser arcuate extent, said links which are connected to the larger of said segments being of shorter effective length than said links which are connected to the smaller of said segments.

12. A drum as claimed in claim 11, each said segment having a plurality of pairs of pivot connections one of each said pair of connections being connected respectively to one of each said pair of links, the other of each pair of connections being pivotally connected to the other of each said pair of links, one connection of each said pair thereof being located axially intermediate thereof and angularly spaced apart from the respective other connections of each said pair thereof.

13. A drum as claimed in claim 12, each said segment comprising a base segment and a cooperating pair of cover segments, each said cover segment having an arcuate portion of one of said flanges fixed at the axially outward end thereof and having means for adjustably fixing its axial position relative to the respectively associated base segment.

14. A drum as claimed in claim 3, further comprising means corotatably connecting one hub means of each said pair of hub means with shaft means drivably connectable to turning means disposed axially outwardly of said drum and operable to rotate said shaft means relatively with respect to said spindle means.

15. A drum as claimed in claim 3, said operating means including gear means operable to effect opposite rotations of the respective hub means of each said pair of hub means.

16. A drum as claimed in claim 15, said gear means comprising a bevel pinion mounted rotatably about an axis normal to said spindle means between each pair of hub means and in driving engagement with a bevel gear secured corotatably on each one of said hub means.

17. A drum as claimed in claim 16, said pairs of hub means including one hub means common to two of said pairs thereof and disposed centrally of the axial length of said drum, a bevel gear mounted corotatably on each axial end of said one hub means, a plurality of bevel pinions drivably meshed with each said bevel gear and respectively with bevel gears corotatably mounted on the respectively next adjacent and other hub means of the said two pairs thereof whereby the operating forces for collapsing and expanding the drum are distributed equally to each half of the drum.

18. A drum as claimed in claim 3, said operating means comprising an operating shaft extending from end to end coaxially within said spindle means and mounted for rotation selectively with and relative to said spindle means, said spindle means having a radial opening through the wall thereof, and a member secured rigidly to said shaft and to one hub means of each said pair of hub means, said one hub means being thereby made corotatable with said shaft.

19. A drum as claimed in claim 18, said operating means also including means on said shaft and means on said spindle means cooperable to limit rotation of said shaft relative to said spindle means.

20. A drum as claimed in claim 3, each said pair of hub means including one hub having a pivot connection connected to one link of each said pair of links and another hub having a pivot connection to the other link of each said pair of links, said one hub and said other hub being rotatable only in opposite senses in response to operation of said operating means.

21. A drum as claimed in claim 20, comprising means corotatably connecting one hub of each said pair of hubs with shaft means drivably connectable to turning means disposed axially outwardly of said drum and operable to rotate said shaft means relatively with respect to said spindle means.

22. A drum as claimed in claim 21, said plurality of segments including a plurality of large segments of greater arcuate extent and a plurality of small segments of lesser arcuate extent, said links which are connected to the large segments being of shorter effective length than said links which are connected to the small segments.

23. A drum as claimed in claim 22, each hub of said hub means having a plurality of pin lugs equally spaced about the axis thereof, the pairs of said lugs connected to the small segments being spaced angularly forward of, in the respective directions of rotation, the pairs of lugs connected to the large segments.

24. A drum as claimed in claim 3, said spindle means comprising a hollow spindle having an integral flange adapted for mounting on a tire building machine, a plurality of axially spaced bearing means for supporting said plurality of pairs of hub means for rotation thereabout, a plurality of collars disposed coaxially between respective pairs of said bearing means and a plurality of pinion mounting studs fixed on each said collar.

25. A drum as claimed in claim 24, each said pair of hub means including one hub having a pivot connection connected to one link of each said pair of links and another hub having a pivot connection to the other link of each said pair of links, said one hub and said other hub being rotatable only in opposite senses in response to movement of said operating means.

26. A drum as claimed in claim 25, said operating means including gear means operable to effect opposite rotations of the respective hubs of each said pair of hubs, said plurality of segments including a plurality of large segments of greater arcuate extent and a plurality of small segments of lesser arcuate extent, said links which are connected to the large segments being of shorter effective length than said links which are connected to the small segments.

27. A drum as claimed in claim 26, said gear means comprising a bevel pinion mounted rotatably one about each of said studs in driving engagement with a pair of bevel gears secured corotatably one on each one of said hubs.

28. A drum as claimed in claim 27, said operating means comprising an operating shaft extending coaxially within said spindle means and mounted for rotation selectively with and relative to said spindle means, said spindle means having a radial opening through the wall thereof, and a member secured rigidly to said shaft and to one hub of each said pair of hubs, said one hub being thereby made corotatable with said shaft.

29. A drum as claimed in claim 28, each said pair of links including a rigid link pivotally connected to each said segment intermediate the axial ends thereof at a first angular location and pivotally connected to one hub of each said pair of hubs, a second rigid link pivotally connected to the other hub of each said pair of hubs and to each said segment axially outwardly of the first said link and at a second angular location spaced from the first said location.

30. A drum as claimed in claim 29, further comprising means for limiting angular displacement of said segments during their inward or outward movement relative to the axis.

31. A drum as claimed in claim 30, said limiting means comprising a pivot pin lug having a pivot pin engaging a respectively associated link on each said segment, an arcuate slot terminating in radially extended ends formed on said lug coaxially of said pivot pin in said pin lug, and a stop pin fixed on said link, said stop pin being movable arcuately of said slot only between said ends.

32. A drum as claimed in claim 30, said limiting means comprising a guide sleeve and a rod slidable therein, one of said sleeve and said rod being rigidly secured to each of a plurality of said segments and the other of said sleeve and rod being rigidly secured to said spindle.

33. A drum as claimed in claim 30, each said segment having a plurality of pairs of pivot connections one of each said pair of connections being connected respectively to one of each said pair of links, the other of each said pair of pivot connections being pivotally connected to the other of each said pair of links, one connection of each said pair thereof being located aixally intermediately of and angularly spaced apart from the respective other connections of each said pair thereof.

* * * * *